US009397467B2

(12) United States Patent
Cormier et al.

(10) Patent No.: US 9,397,467 B2
(45) Date of Patent: Jul. 19, 2016

(54) OPTICAL PUMPING DEVICE

(75) Inventors: Eric Cormier, Cestas (FR); Jérôme Lhermite, Anglet (FR); Dominique Descamps, Gradignan (FR); Guillaume Machinet, Talence (FR)

(73) Assignee: UNIVERSITE BORDEAUX 1, Talence (FR)

( * ) Notice: Subject to any disclaimer, the term of this patent is extended or adjusted under 35 U.S.C. 154(b) by 18 days.

(21) Appl. No.: 14/000,002

(22) PCT Filed: Feb. 16, 2012

(86) PCT No.: PCT/FR2012/050331
§ 371 (c)(1),
(2), (4) Date: Oct. 28, 2013

(87) PCT Pub. No.: WO2012/110748
PCT Pub. Date: Aug. 23, 2012

(65) Prior Publication Data
US 2014/0055844 A1      Feb. 27, 2014

(30) Foreign Application Priority Data
Feb. 16, 2011   (FR) .................................. 11 51276

(51) Int. Cl.
*H01S 3/067* (2006.01)
*H01S 3/23* (2006.01)
(Continued)

(52) U.S. Cl.
CPC ..... *H01S 3/094053* (2013.01); *H01S 3/094003* (2013.01); *H01S 3/094007* (2013.01); *H01S 3/094042* (2013.01); *H01S 3/042* (2013.01); *H01S 3/0602* (2013.01); *H01S 3/0811* (2013.01);
(Continued)

(58) Field of Classification Search
CPC .... H01S 3/067; H01S 3/06708; H01S 3/2308
See application file for complete search history.

(56) References Cited

U.S. PATENT DOCUMENTS 8,941,912 B2 *  1/2015  Tanigawa et al. .......... 359/341.5
2001/0036205 A1  11/2001  Chicklis et al.
(Continued)

FOREIGN PATENT DOCUMENTS

EP         1146612 A1    10/2001
WO     2009021312 A1     2/2009
WO     2010083595 A1     7/2010

OTHER PUBLICATIONS

Yla-Jarkko et al. "A 3.5 W 977 nm Cladding-pumped Jacketed Air-Clad Ytterbium-doped fiber laser", Advanced Solid-State Photonics (Feb. 2, 2003), OSA Trends in optics and photonics (paper 103).*
(Continued)

*Primary Examiner* — Eric Bolda
(74) *Attorney, Agent, or Firm* — Cantor Colburn LLP

(57) ABSTRACT

The invention relates to an optical pumping device comprising: a fibre light source emitting controlled radiation having a very high transverse modal quality, with a wavelength shorter than 1000 nm; at least one element consisting of an amplifying material doped with a rare earth dopant; means for introducing a pumping light into said doped amplifying material element; and means for cooling said amplifying material. Said optical pumping device is characterised in that the pumping light is emitted by the fibre light source with an average power of higher than 2W and a modal quality characterised by an M2<5 factor.

14 Claims, 10 Drawing Sheets

(51) Int. Cl.
*H01S 3/094* (2006.01)
*H01S 3/042* (2006.01)
*H01S 3/06* (2006.01)
*H01S 3/081* (2006.01)
*H01S 3/11* (2006.01)
*H01S 3/16* (2006.01)

(52) U.S. Cl.
CPC ..... *H01S 3/094038* (2013.01); *H01S 3/094069* (2013.01); *H01S 3/1112* (2013.01); *H01S 3/1118* (2013.01); *H01S 3/165* (2013.01); *H01S 3/1618* (2013.01); *H01S 3/235* (2013.01); *H01S 3/2308* (2013.01); *H01S 3/2325* (2013.01)

(56) References Cited

U.S. PATENT DOCUMENTS

| | | | |
|---|---|---|---|
| 2002/0018630 A1* | 2/2002 | Richardson et al. | 385/127 |
| 2005/0213616 A1 | 9/2005 | Kaji et al. | |
| 2005/0281301 A1 | 12/2005 | Mirror et al. | |
| 2006/0146901 A1* | 7/2006 | Budni | 372/39 |
| 2008/0037604 A1* | 2/2008 | Savage-Leuchs | 372/44.01 |
| 2009/0279167 A1* | 11/2009 | Vigroux et al. | 359/347 |
| 2010/0157419 A1* | 6/2010 | Clowes et al. | 359/341.31 |
| 2011/0142083 A1* | 6/2011 | Tanigawa et al. | 372/6 |
| 2011/0292952 A1* | 12/2011 | Boullet et al. | 372/6 |

OTHER PUBLICATIONS

International Search Report for corresponding application PCT/FR2012/050331 filed Feb. 16, 2012; Mail date Jun. 6, 2012.
Ming-Yuan Cheng, "High-energy and high-peak-power nanosecond pulse generation with beam quality control in 200-um core highly multimode Yb-doped fiber amplifiers" Optics Letters / vol. 30, No. 4 / Feb. 15, 2005, pp. 358-360.
Fu Y et al "Beam quality factor of mixed modes emerging from a multimode step-index fiber", OPTIK, vol. 121, No. 5, Mar. 1, 2010 pp. 452-456, XP026926949.
Karpov V I et al:"LD-Pumped 1.48-um laser based on Yb-doped double-clad fiber and Phosphorosilicate-Fiber Raman Converter", '99 Optical Fiber Communication Conference / International Conference on Integrated Optics and Optical FiberCommunication. San Diego, Ca, Feb. 21-26, 1999; pp. WM3-01, XP000966930.
A. Pugzlys, "Multi-mJ, 200-fs, cw-pumped, cryogenically cooled Yb,Na:CaF2 amplifier", Optics Letters, Jul. 1, 2009 / vol. 34, No. 13, pp. 2075-2077.
Sandrine Ricaud, "Short-pulse and high-repetition-rate diode-pumped Yb:CaF2 regenerative amplifier", Optics Letters, Jul. 15, 2010 / vol. 35, No. 14, pp. 2415-2417.
S. Ricaud, "Highly efficient, high-power, broadly tunable, cryogenically cooled and diode-pumped Yb:CaF2", Optics Letters, Nov. 15, 20101 / vol. 35, No. 22, pp. 3757-3759.
F. Röser, "Millijoule pulse energy high repetition rate femtosecond fiber chirped-pulse amplification system", Optic Letters, Dec. 15, 2007 / vol. 32, No. 24, pp. 3495-3497.
Mathias Siebold, "Terawatt diode-pumped Yb:CaF2 laser", Optics Letters, vol. 33, No. 23 / Dec. 1, 2008, pp. 2770-2772.

\* cited by examiner

OPTICAL PUMPING DEVICE

TECHNICAL FIELD OF THE INVENTION

The present invention relates to an optical pumping device. This device is particularly suitable for amplifying and/or guiding a laser beam and for producing a laser oscillator. It may be used in any field of application using laser light. Furthermore, the present invention also relates to a laser amplification architecture comprising this optical pumping device.

PRIOR ART

The considerable attention that power lasers have experienced for a number of decades has opened the way to the discovery and study of multiple physical phenomena through the implementation of many scientific applications certain of which require exceptional laser performance.

Architectures, such as oscillators or even multipass or regenerative amplifiers, that are capable of producing such lasers then require an adequate optical pumping device.

The optical pumping produced by such devices corresponds to a population inversion process consisting in making ions pass from their unexcited state to an excited state by making each of them absorb a photon.

Optical pumping may be used to generate a laser beam, i.e. to achieve population inversion in an active medium located in a laser oscillator, or even to amplify and/or to guide an existing laser beam, for example emitted by a laser diode, by passing it through an active medium of an optical pumping device. In practice, optical pumping consists in propagating one or more laser beams, called pump beams, in the active medium, itself passed through by a beam emitted by a laser source, called the signal laser beam.

To do this, these optical pumping devices generally comprise a specific optical pumping source that must have an excellent beam quality with a very high power, able to deliver the highest luminosity possible.

Laser diodes are examples of such sources. These laser diodes are capable of delivering powers of several kW at 976 nm.

However, the brightness is severely limited by the large emission area and requires the beams coming from the various emitters in the stack of diode bars to be shaped. It is possible to obtain a good spatial quality from these laser diodes ("single-transverse-mode" beams in which the emitted beam is diffraction limited are spoken of) but the maximum power currently produced varies from a few hundreds of mW to a few watts if special structures are used.

The decision to use laser sources emitting in the infrared wavelength range is justified by their advantages, in particular: their compactness, their longevity, their high electrical efficiency and their low manufacturing costs.

However, the decision to use these laser diodes represents only a compromise between power and beam quality, which is undeniably a drawback in situations where a high power density is required.

Although these laser diodes are high-power diodes they are not bright and cannot contribute to high-brightness pumping of doped materials.

Other sources are known in the prior art, such as, for example, semiconductor laser diodes such as OPSLs (optically pumped semiconductor lasers), which are laser emitters based on half-VCSELs (vertical-cavity surface-emitting lasers). The small thickness of these semiconductors makes optical pumping with high-power but low-luminosity diodes possible.

A major drawback with this type of diode is that they have constraining thermal properties that limit their use. Specifically, these diodes require onerous cooling means to function normally.

Furthermore, these sources have a higher pointing stability than conventional diodes. Lastly, although at the present time they are the brightest commercially available sources, they are very expensive.

Moreover, laser architectures having an amplifying medium formed by a material doped with Yb ions, which ions are used in laser sources lasing substantially at 976 nm, are known in the prior art.

These laser architectures comprise optical pumping devices emitting in the spectral band between 910 nm and 940 nm.

Solutions based on materials doped with rare-earth ions, for example ytterbium ions, pumped by diode, use either crystals or optical fibres into which the dopant ions are incorporated. The fibre-based solution has the advantage of being a solution that is entirely fibre-based, and therefore compact, ultrastable and reliable.

In addition, solutions involving solid amplifying media doped with rare-earth ions emitting substantially at 976 nm make opto-optic conversion between the power delivered by the pump and the power delivered by the laser possible with a conversion efficiency that can reach as high as 80%.

However, a very specific amplifier geometry (cross section and length of the amplifying medium), pumping beam geometry, and pumping level geometry must be used to obtain emission, substantially at the laser wavelength of 977 nm, from a solid amplifying medium (crystal or silica) doped with ytterbium ions.

It will therefore be noted that a major drawback of using these various light sources lies in the fact that although certain of them are high-power sources, they are not sufficiently bright to contribute to high-brightness optical pumping of materials doped with a rare-earth dopant.

SUMMARY OF THE INVENTION

The invention therefore proposes to improve the optical pumping, induced by optical pumping devices implemented in laser amplification architectures, for laser amplification of rare-earth-doped materials.

For this purpose, one aspect of the invention relates to an optical pumping device comprising:
- a fibre-based optical source emitting a controlled radiation beam with a very high transverse mode quality at a wavelength shorter than 1000 nm;
- at least one element made of an amplifying material doped with a rare-earth dopant;
- means for introducing pumping light into said doped amplifying material element; and
- means for cooling said amplifying material,
- in which the pumping light is emitted by the fibre-based optical source with an average power higher than 2 W and a mode quality characterized by an $M^2<5$.

In particular embodiments:
the fibre-based source comprises:
- at least one laser diode having an excitation wavelength between 750 nm and 976 nm, which laser diode is able to emit a pumping wave;
- a pumping cladding;

a section of clad amplifying optical fibre having two ends, said amplifying optical fibre containing a core comprising a cylindrical part doped with a rare earth chosen from ytterbium, erbium, and thulium, in order to obtain a core with a refractive index higher than that of the cladding; and means for coupling said pumping source to the cladding of the doped fibre;

the fibre-based source has an emission spectrum lying in a band between 970 and 985 nm;

the element made of an amplifying material doped with a rare-earth dopant is chosen from an optical fibre, a crystal, and a combination of these two elements;

the fibre is chosen from a single-core fibre, a twin-core fibre, and a crystal fibre;

the cooling means are arranged along the element made of a doped amplifying material;

the cooling means cool said element made of a doped amplifying material with air, water or via the Peltier effect or even cryogenically;

the rare earth is chosen from ytterbium, thulium, erbium, or any one of the combinations of these rare earths;

the combinations are chosen from thulium/ytterbium and erbium/ytterbium;

the ytterbium-doped material used is chosen from Yb:SYS, Yb:BOYS, Yb:GdCoB, Yb:CaGdAlO$_4$, Yb:KGW, Yb:YAG, Yb:CaF$_2$, Yb:KGW, Yb:KYW, Yb:GSO, Yb:GYSO, and Yb:glass;

the means allowing pumping light to be introduced into the amplifying material are coupling means and selecting elements;

the coupling means comprise lenses chosen from any one of at least the following lenses: microlenses, cylindrical lenses, elliptical lenses, hyperbolic lenses, aspheric condenser lenses, and spherical or parabolic mirrors; and the selecting elements relate to an element chosen from at least one of any of the following elements: a dichroic mirror, an absorbing or interferometric or acousto-optic filter, a bend in the amplifying fibre, a dopant element added to the core of the amplifying fibre, an external volume grating, a prism, and a Bragg grating.

The invention also relates to an amplifier architecture comprising optical pumping means comprising an optical pumping device such as defined here above.

In particular embodiments:

the amplifier architecture is one of the following devices:
  an oscillator;
  a single-pass or multipass amplifier;
  a regenerative amplifier;
  an architecture for pumping a core of an active fibre doped with Yb, Tm, Er or any combination thereof; and
  an architecture for pumping a crystal fibre in which the pumping beam is not guided by said crystal fibre;

the amplifier architecture is able to produce a radiation beam at a wavelength longer than 1000 nm, the amplification of which is obtained using the optical pumping device defined in Claims 1 to 13.

BRIEF DESCRIPTION OF THE FIGURES

Other features and advantages of the invention will become more clearly apparent on reading the following description, given with reference to the appended figures, which illustrate.

For the sake of clarity, identical or similar elements have been referenced with identical reference symbols in all the figures.

DETAILED DESCRIPTION OF AN EMBODIMENT

In one embodiment, the optical pumping device comprises a fibre-based optical source emitting a controlled radiation beam with a very high transverse mode quality at a wavelength shorter than 1000 nm.

The expression "very high quality" is understood to mean a mode near the diffraction limit, characterized by an $M^2$ factor near 1 and below 5 whatever the delivered power.

The fibre of this optical source, a description of which is given below, is substantially similar to that described in French patent documents FR 09/05271 and FR 08/55879.

Figure 1:
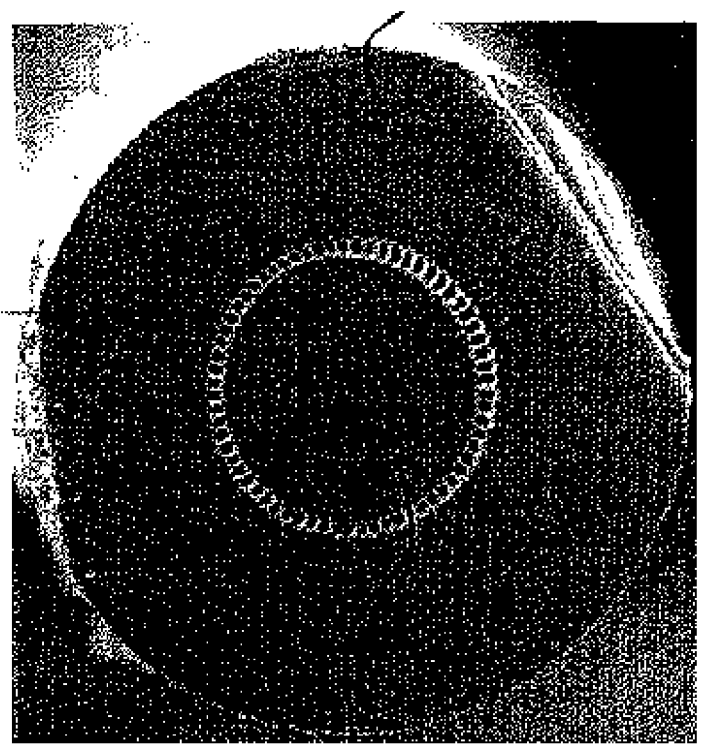
FIG. 1, a cross-sectional view of a fibre used in the optical source in one embodiment of the present invention.

FIG. 1 shows a cross-sectional view of a fibre according to one embodiment of the invention.

The fibre is an "air-clad" fibre with an outside diameter of 200 µm, a cladding diameter of 80 µm and a core diameter of 20 µm. The core of the fibre consists of a cylindrical zone with a refractive index higher than that of the cladding. This core is doped throughout its volume with the rare-earth element Yb, and with one or more co-dopants chosen from P, Ce, Al and Ge. The multimode guide is defined by the air-clad.

It will be noted that in other embodiments other non-microstructured, non-air-clad fibres having the same properties and advantages as the microstructured air-clad fibre described in FIG. 1 may also be used in the present invention.

In the ideal case, this fibre would have a core diameter of about 25 µm and a cladding diameter of about 100 µm (area ratio between the cladding and the core of 16). A core diameter between 10 and 30 µm is acceptable for the application. Preferably, the area ratio between the cladding and the core of the fibre will be between 6 and 25 for effective laser operation at 976 nm. It turns out that it is difficult to observe laser radiation at 976 nm above a ratio of 50.

It will be noted that alternatively the diameter of the cladding may be larger than 50 microns, the ratio of the areas of the doped core and pumping cladding lying between 3 and 50.

The core, which has a numerical aperture of 0.06, is weakly multimode at 976 nm. The area of the pumping cladding is about 10 times larger than that described in the document by Ylla Jarkko et al, "A 3.5 W 977 nm jacketed air clad fibre laser ytterbium doped fibre laser", OSA Trends in Optics and Photonics, Advanced Solid State Lasers, Vol. 34, 2000).

This area allows several tens of watts of pumping power to be injected. Laser performance at 976 nm (FIG. 2) exhibits an output power of 10 W at 976 nm and a very low ASE level at 1030 nm. This power, which is limited only by the available pumping power, is three times higher than the preceding record for a flexible fibre. The efficiency of the system (30%) is limited by the degree of coupling of the pump to the air-clad (the numerical aperture of the air-clad was 0.4, but a numerical aperture higher than 0.6 is envisageable).

On account of the brightness level of state-of-the-art diodes, it is envisageable to inject more than 100 W into such a fibre, thereby providing an output power higher than 50 W at 976 nm with a reasonable efficiency of 50%.

In the first instance, such a fibre allows the spatial quality of the output to be improved.

The spatial quality of an optical mode is defined by its $M^2$ parameter, $M^2=1$ corresponding to a perfectly Gaussian diffraction limited mode. The $M^2$ parameter of the output measured for a laser according to the invention is 1.17 for a fibre wound round a mandrel that is 210 mm in diameter. Despite the multimode nature of the fibre, the laser naturally oscillates in its fundamental mode, aided by the slight curvature that creates additional differential losses in higher order modes.

Such a fibre also allows spectral quality to be improved. Spectral selection is not possible with a laser cavity defined by simple mirrors. The laser emission then takes the form of a multitude of lines about the gain maximum at 976 nm (free-running laser).

This fibre-based optical source is able to emit pumping light with an average power higher than 2 W and with a mode quality characterized by an $M^2<5$. A 94 W version in a free-running laser configuration has already been produced with a rod-type fibre. However, a particular effort must be made to operate this laser with a high-performance spectral filter forming wavelength-tunable (970-985 nm) narrow-band laser beams with powers of a few tens of watts.

This optical pumping source may be operated either in a laser configuration (laser cavity with a spectral filter), or as an ASE (amplified spontaneous emission) source, or in an MOPA (master oscillator power amplifier) configuration with either a low-power fibre laser, or a low-power single-mode diode, or an ASE source amplified downstream by a fibre-based power amplifier, as an initial source. To pump Yb-doped materials, the ASC source configuration is in practice particularly practical.

The pumping device also comprises an element made of an amplifying material doped with a rare-earth dopant. This element made of doped amplifying material is for example an optical fibre or even a crystal or even a glass, or even a combination of these elements.

This optical fibre may correspond to a single-core fibre the optical pumping of which is carried out directly in the core, or to a twin-core fibre or to a crystal fibre.

This fibre may also, in a nonlimiting manner, be a microstructured air-clad fibre or, in contrast, a non-microstructured, non-air-clad fibre.

This element made of a doped amplifying material is generally a crystal or a glass that may be long or short in size and that may, in a nonlimiting manner, be between 100 microns and 50 centimeters in size.

This material is doped with at least one rare earth chosen from ytterbium, thulium, erbium or any one of the combinations of these rare earths such as: thulium/ytterbium, and erbium/ytterbium.

It will be noted that the ytterbium-doped material used is chosen from: Yb:SYS, Yb:BOYS, Yb:GdCoB, Yb:CaGdAlO$_4$, Yb:KGW, Yb:YAG, Yb:CaF$_2$, Yb:KGW, Yb:KYW, Yb:GSO, Yb:GYSO, or even Yb:glass.

Using the optical source, high-brightness pumping for the absorption of the ytterbium ions is carried out at about 976 nm. The pumping device is indeed particularly suitable for optical pumping of this type of ions at this wavelength of 976 nm.

However, at the wavelength about 976 nm this optical pumping device may also be used, in a nonlimiting manner, to optically pump other ions of different materials such as thulium (Tm) or erbium (Er), or even thulium/ytterbium or erbium/ytterbium co-doped materials.

It will in particular be noted that when thulium/ytterbium or erbium/ytterbium co-doped materials are employed it is possible to use the absorption wavelength of ytterbium (Yb) ions (wavelength of about 976 nm) to transfer energy from the excited state of ytterbium (Yb) to that of the thulium (Tm) or erbium (Er) ions with the aim of generating a population inversion between the Er or Tm lasing levels.

The optical pumping device comprises means allowing pumping light to be introduced into the amplifying material, i.e. coupling means and selecting elements.

These coupling means comprise lenses chosen from any one of at least the following lenses: microlenses, cylindrical lenses, elliptical lenses, hyperbolic lenses, and aspheric condenser lenses.

The selecting elements correspond, non-exhaustively, to the following elements: a dichroic mirror, an absorbing or interferometric filter or an active electro-optic or acousto-optic filter, a bend in the amplifying fibre, a dopant element added to the material forming the core of the amplifying fibre, an external volume grating, a prism, and a Bragg grating.

In the optical pumping device, cooling means are provided in order to cool the element made of doped amplifying material with air, water, via the Peltier effect, or even cryogenically.

Thus, the optical pumping device therefore makes high-brightness pumping of materials doped with ytterbium, and also with thulium or even erbium (Er), possible.

This high-brightness pumping cannot be achieved using high-powered laser diodes because they are not bright. By virtue of the very bright 976 nm optical source of the optical pumping device, high-brightness pumping of ytterbium-doped materials becomes possible.

Such an optical pumping device, comprising an optical source corresponding to this high-power fibre laser that allows solid yttrium-based materials to the optically pumped, may be employed in various amplification architectures, such as:
  an oscillator;
  a single-pass or multipass amplifier;
  a regenerative amplifier;
  an architecture for pumping a core of an active fibre doped with Yb, Tm, Er or any combination thereof; and
  an architecture for pumping a crystal fibre in which the pumping beam is not guided by said crystal fibre.

Figure 2:
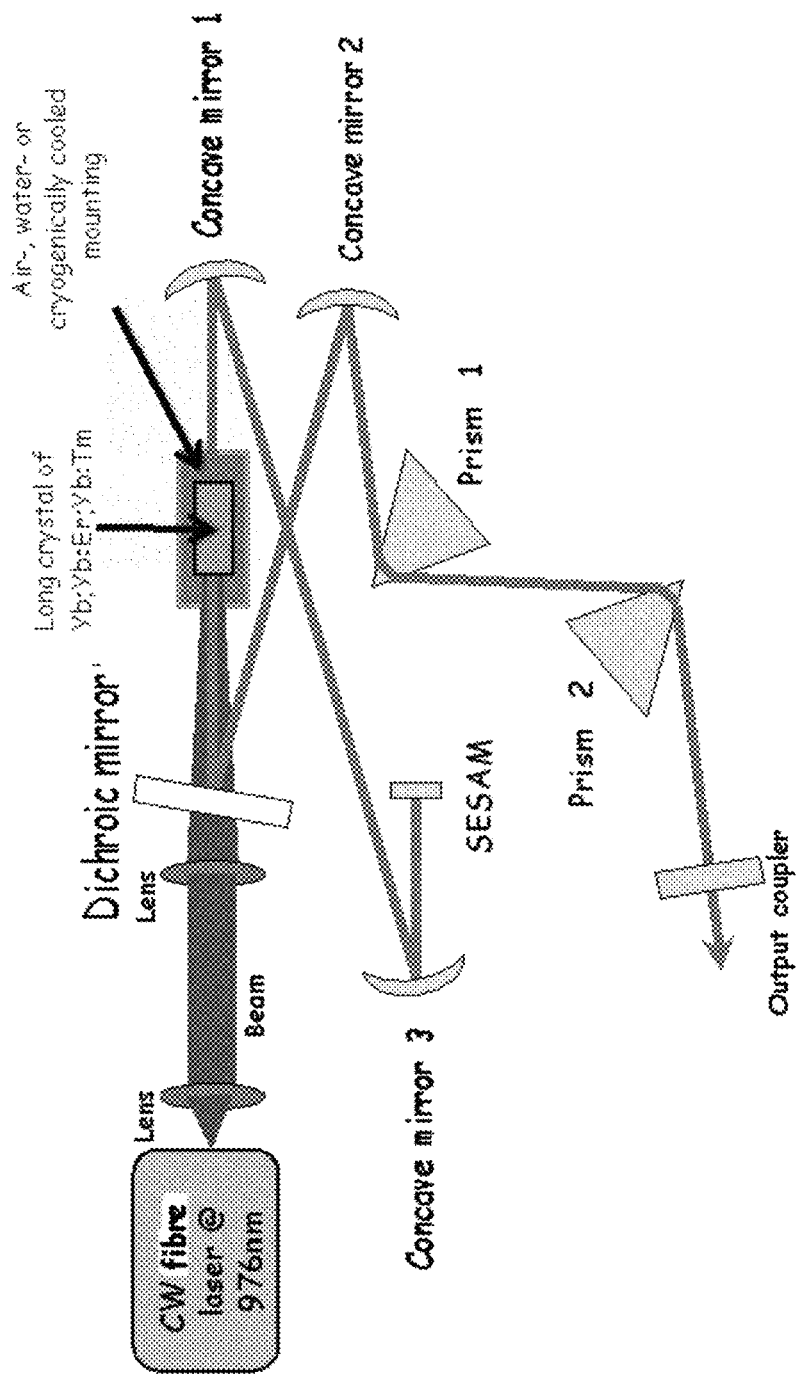
FIG. 2, a schematic of a first laser amplifier architecture forming an oscillator.

In FIG. 2, a first architecture forming a Kerr-lens mode-locked oscillator is illustrated. The cavity is composed of a number of concave mirrors, a prism pair for controlling dispersion, an SESAM that initiates the mode-locked operating regime, an output coupler closing the laser cavity, and a long crystal doped with Yb or co-doped with Yb:Er or Yb:Tm.

The latter may be air-cooled, water-cooled or cryogenically cooled. It is pumped by the high-brightness fibre laser source emitting at about 976 nm, via two lenses and a dichroic mirror.

Such a fibre laser source allows a long crystal (between 0.5 and 50 mm in length) to be used in the oscillator while preserving a good overlap between the signal and the pump over the entire length of the crystal.

Figure 3:
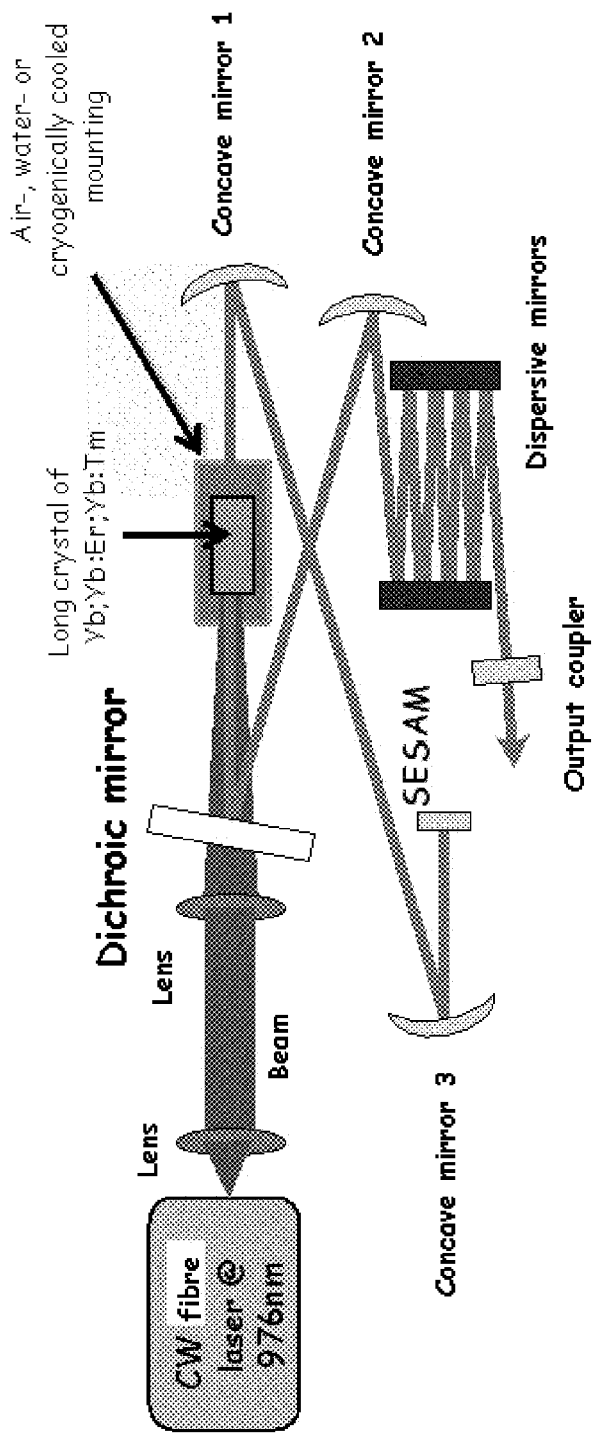
FIG. 3, a schematic of a second laser amplifier architecture forming an oscillator.

In FIG. 3, a second architecture forming a Kerr-lens mode-locked oscillator is illustrated; it is based, as regards its architecture and its operation, on the same principle as the oscillator in FIG. 2. The only difference is that the prism pair has been replaced with a pair of dispersive mirrors.

Figure 4:
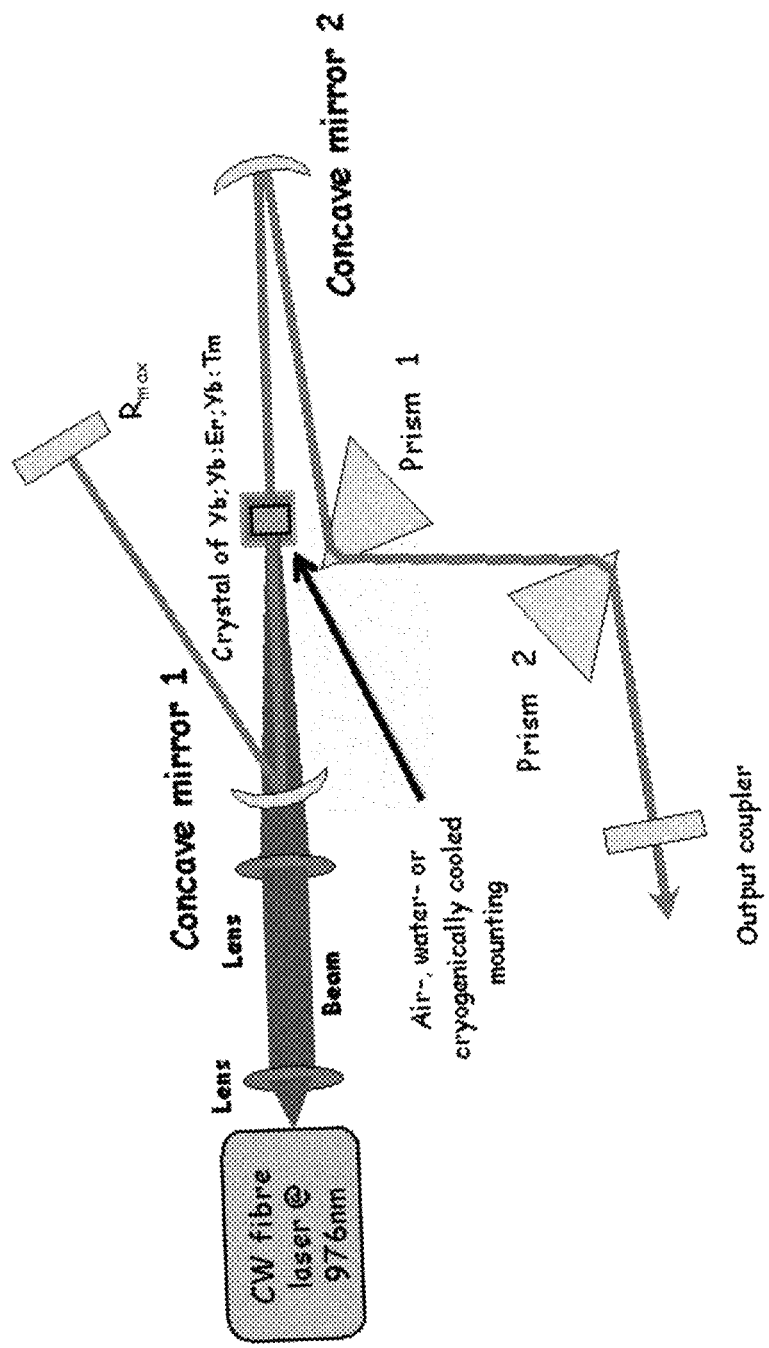
FIG. 4, a schematic of a third laser amplifier architecture forming an oscillator.

In FIG. 4, a third architecture forming a Kerr-lens mode-locked oscillator is illustrated. The cavity is composed of a number of concave mirrors, a prism pair for controlling dispersion, an output coupler closing the laser cavity, and a crystal doped with Yb or co-doped with Yb:Er or Yb:Tm.

This crystal may be air-cooled, water-cooled or cryogenically cooled. It is pumped by the high-brightness fibre laser source emitting at about 976 nm. Such a source makes it possible to obtain, by focusing it onto the crystal, much smaller beams than are possible with a multimode pump.

Figure 5:
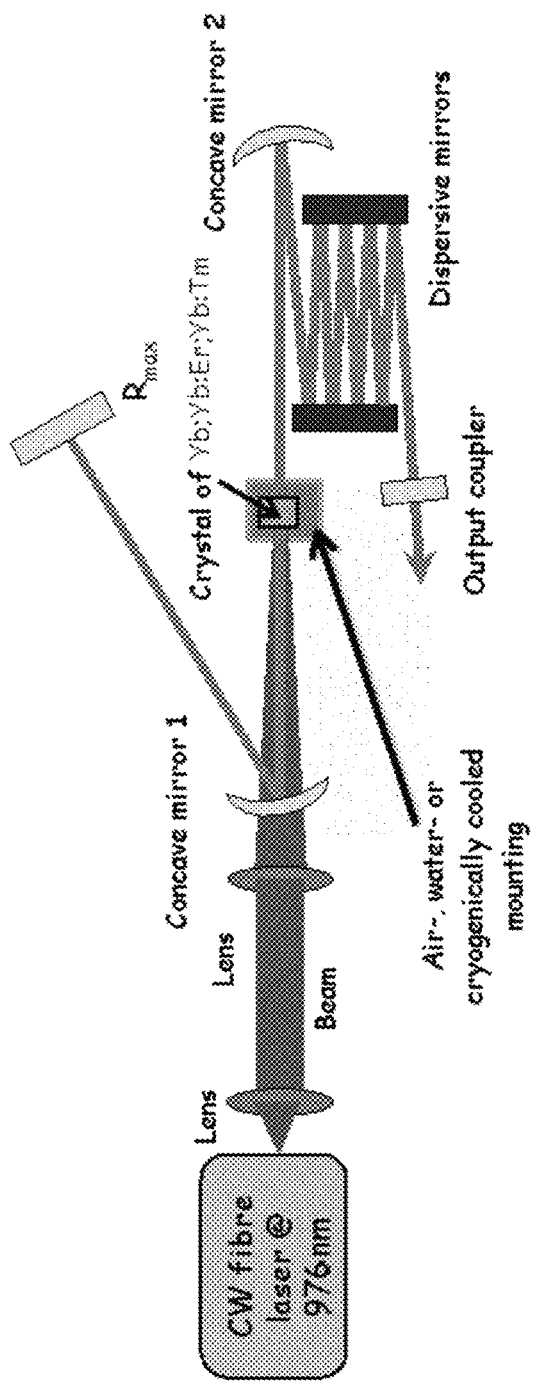
FIG. 5, a schematic of a fourth laser amplifier architecture forming an oscillator.

In FIG. 5, a fourth architecture forming a Kerr-lens mode-locked oscillator is illustrated. This architecture is based on the same principle as that in FIG. 4, the only difference being that the prism pair has been replaced with a pair of dispersive mirrors.

Figure 6:
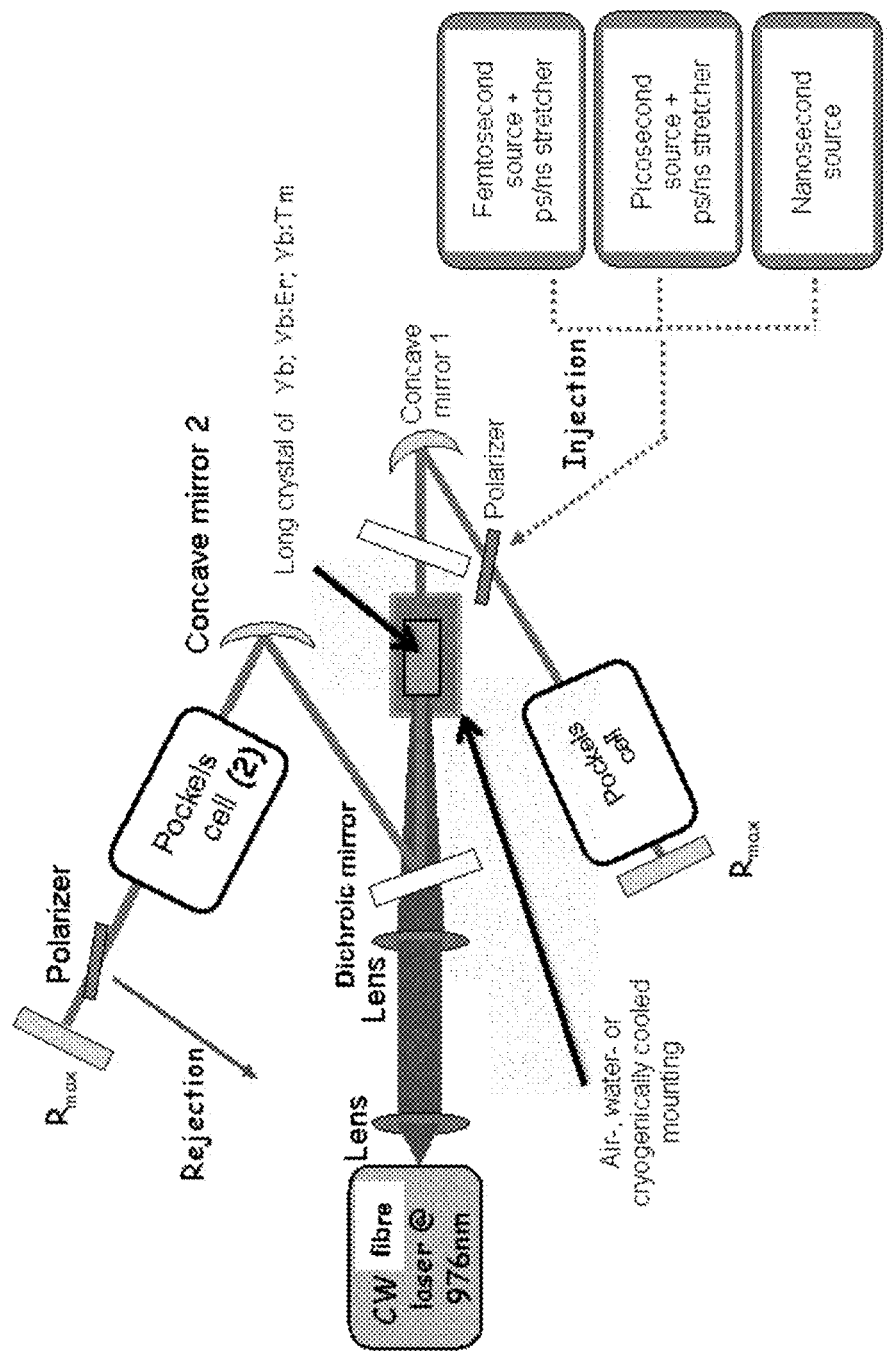
FIG. 6, a schematic of a fifth laser amplifier architecture forming a regenerative amplifier.

In FIG. 6, a seventh laser amplification architecture forming a regenerative amplifier is shown.

This architecture is composed of a cavity formed from flat mirrors and concave mirrors. The signal to be amplified is injected by a polarizer and a first Pockels cell. The pulse is then trapped in the cavity and, on each pass, travels through the amplifying medium, extracts energy, and is amplified.

Once the desired gain, corresponding to so many round-trips, has been obtained, the second Pockels cell will act as a switch changing the polarization of the amplified light pulse, and the latter will then be able to be rejected by way of a second polarizer.

Using the high-brightness source makes it possible to use wider beams and therefore to increase the threshold of damage to the optical components forming the cavity, and therefore to increase the amplification provided by the regenerative cavity.

In addition, on account of the very high spatial quality of the beam of the pumping device, a concave dichroic mirror may be used, instead of the flat dichroic mirror, to inject the pump, in order to more narrowly focus this beam.

Figure 7:
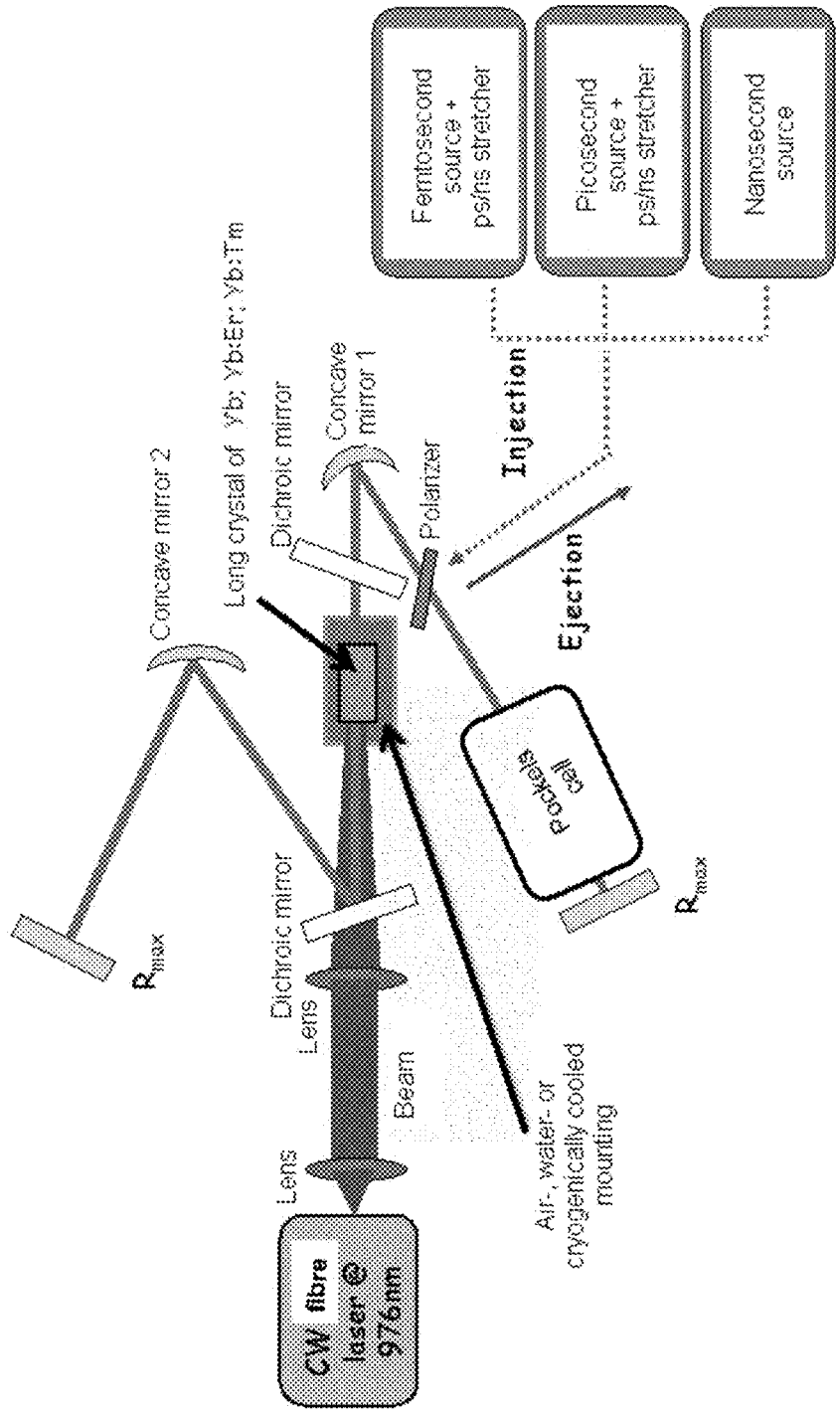
FIG. 7, a schematic of a sixth laser amplifier architecture forming a regenerative amplifier.

In FIG. 7, a sixth architecture forming a regenerative amplifier is illustrated. It is based on the same principle as the amplifier in FIG. 6, the only difference being that a Pockels cell and a single polarizer are used to inject and eject the laser beam pulse.

Figure 8:
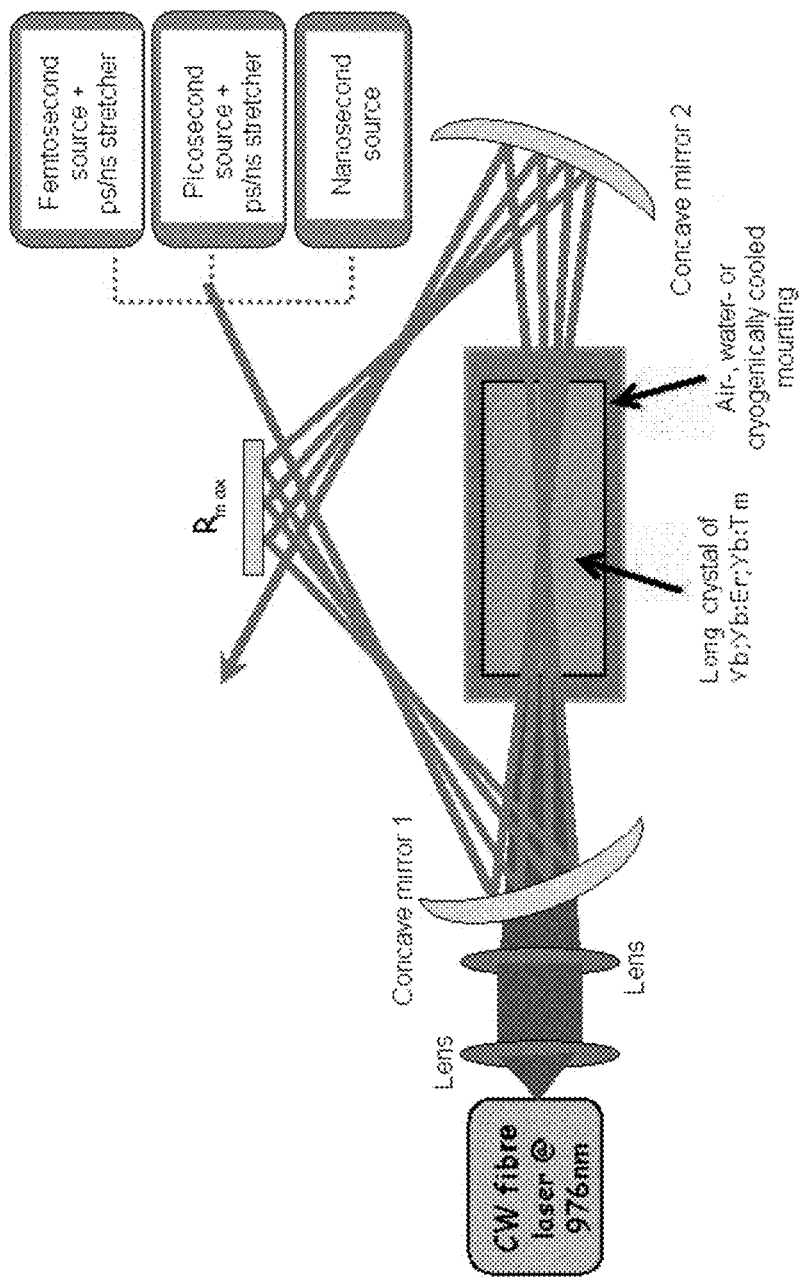
FIG. 8, a schematic of a seventh laser amplifier architecture forming a multipass amplifier.

FIG. 8 shows a seventh laser amplification architecture forming a multipass amplifier.

This architecture is composed of two concave mirrors and a flat mirror. The signal is reflected a number of times from these three mirrors in order to obtain multiple passes through the crystal.

Using the high-brightness source makes it possible to employ a lens having a much longer focal length than is possible with a multimode pump, to couple the pump to the crystal. Therefore, the angle of attack that the pump makes with the crystal is much smaller, resulting in an increased pump/signal interaction length and making it possible to use long (5 mm to 50 mm in length) amplifying materials.

Figure 9:
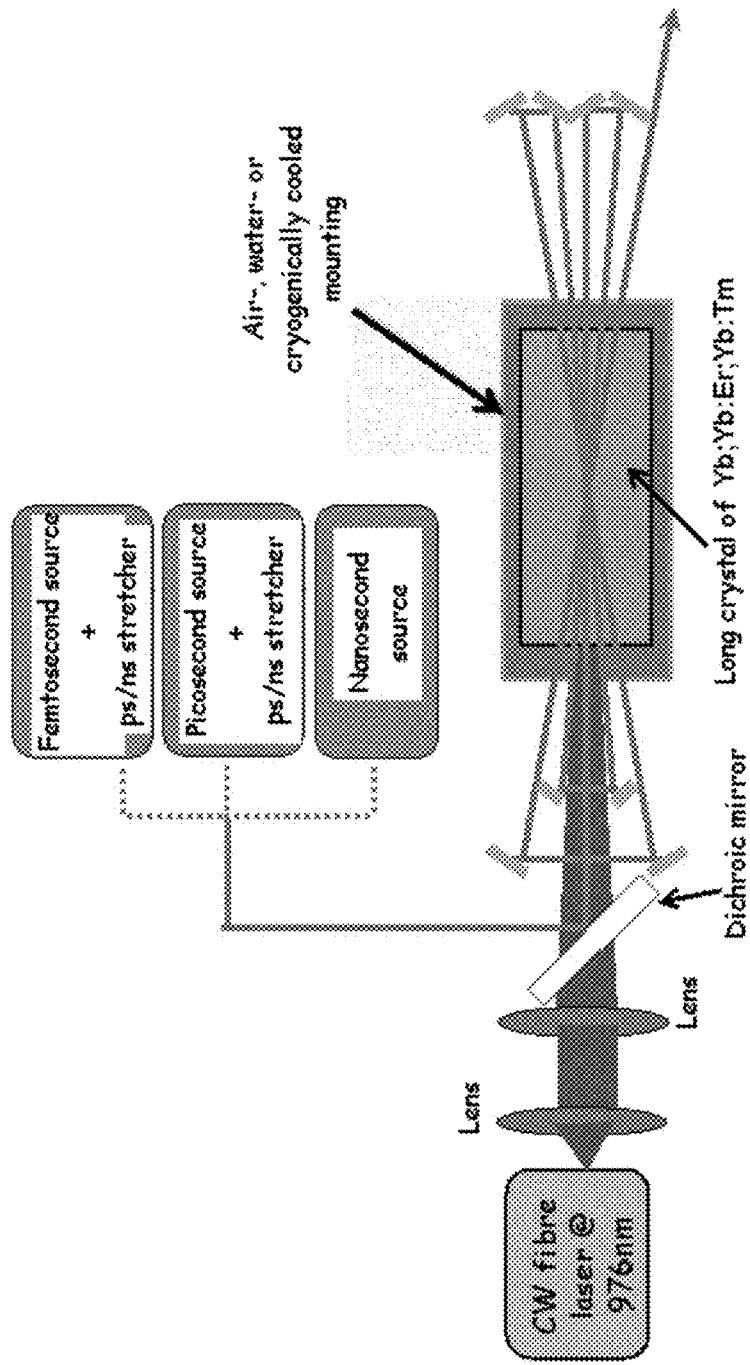
FIG. 9, a schematic of an eighth laser amplifier architecture forming a multipass amplifier.
Figure 10:
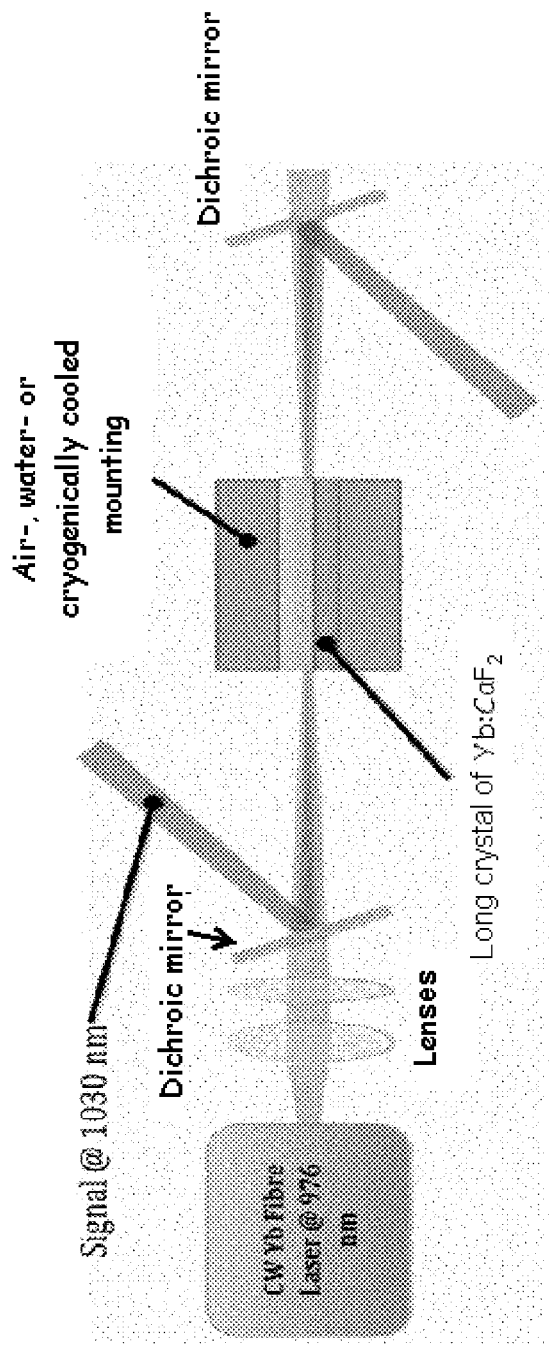
FIG. 10, a schematic of a ninth laser amplifier architecture forming a power amplifier.

FIG. 9 shows an eighth laser amplification architecture forming a multipass amplifier. It is composed of a number of concave or flat mirrors. The signal is reflected in turn by each of the mirrors in order to obtain multiple passes through the crystal. Using the high-brightness source makes it possible to employ a lens having a much longer focal length than is possible with a multimode pump, to couple the pump to the crystal. Therefore, the angle of attack that the pump makes with the crystal is much smaller, resulting in an increased pump/signal interaction length and making it possible to use long (5 mm to 50 mm in length) amplifying materials.

The present invention also has the advantage of allowing the performance of such architectures in terms of average power, pulse length, and pulse energy, to be improved by replacing low-brightness laser diodes, used as optical pumps, with the optical source of the optical pumping device according to the present invention.

In addition, the invention ensures better spatial overlap between the pump and the amplified beams over a large length, and decreases thermal effects, especially for optical pumping devices comprising an element made of an ytterbium-doped amplifying material.

FIG. 6 shows a power amplifier. This amplifier is added at the end of a high-power laser amplification chain. The architecture provided here may be used either in CW mode, or even in pulsed mode. This amplifier employs the optical pumping device according to the present invention, especially one employing a long (generally from 1 to 15 cm in length, or even more if necessary) crystal of an Yb-doped material such as for example $Yb:CaF_2$ or Yb:glass or any other type of Yb-doped material. The long geometry of the crystal means that heat generation in the crystal is spread over a greater distance than in conventional short crystals. Moreover, it will be noted that one advantage of the present invention is that, for constant absorption at the pumping wavelength, longer crystals require lower ion doping levels than short crystals, a much better thermal conductivity being obtained at low doping levels. This is recalled in the article "Thermomechanical properties of $Yb^{3+}$ doped laser crystals: Experiments and modeling", published in the Journal of Applied Physics, Volume 108, 123108.

In this amplifier, water cooling is sufficient even for an output power of several watts. Of course Peltier or cryogenic cooling may be used in the case of higher pumping powers.

The high-brightness optical pumping according to the present invention makes it possible, firstly, to envisage high-energy Kerr-effect mode-locked oscillators, by virtue of the bright pump, it also now being possible to obtain the intensity required for the Kerr effect while using long high-energy-storage crystals. Alternatively, the bright pump may be highly focused onto short crystals and generate extremely large non-linear effects that widen the spectrum of the pulses generated, allowing pulse lengths that have never previously been produced with Yb-doped materials.

Furthermore, it will be noted that the fibre-based pump used especially has two features that are associated with its spatial quality and its $M^2$:
  it is possible to focus the pumping beam to beam sizes of about one hundred microns with Rayleigh distances that are large compared to other pumping sources, and this is especially what, in the solution according to the invention, allows long amplifying materials to be used while preserving the good pump/signal spatial overlap+high pumping intensity, thereby guaranteeing a high population inversion density; and
  it is possible to focus the pumping beam to beam sizes of about 10 microns and less, and it is this that makes it possible to envisage ultrashort SESAM-less Kerr-lens oscillators using ytterbium-doped materials.

It will be noted, alternatively, as is described in patent application FR 09/05271, that the fibre-based optical source emitting a controlled single-transverse-mode radiation beam at a wavelength shorter than 1030 nm may comprise:

at least one laser diode able to emit a pumping wave;
a section of clad amplifying optical fibre having two ends, said amplifying optical fibre containing a core and a pumping cladding, the fibre being doped with a rare-earth dopant; and
means for coupling said pumping source to the cladding of said doped fibre,
characterized in that
the core of the doped fibre comprises a cylindrical part doped with a rare earth chosen from ytterbium, neodymium, and thulium, in order to obtain a core with a refractive index higher than that of the cladding;
the excitation wavelength of said laser diode lies between 750 nm and 960 nm; and
the diameter of the cladding is larger than 50 microns and the ratio between the areas of the doped core and the pumping cladding is between 8 and 50.

Advantageously, the cross section of said cladding has a major axis/minor axis ratio of between 1 and 1.4.

Preferably, the diameter of said cladding is 100 microns or more. As a first preferred variant, the emission wavelength lies between 965 nm and 1010 nm, and the fibre is doped with ytterbium.

As a second variant, the emission wavelength lies between 880 nm and 960 nm and the fibre is doped with neodymium.

In various embodiments:
the fibre comprises an external cladding and an internal cladding, the refractive index of the transparent material of the external cladding being lower than that of the internal cladding; and
the cladding of the fibre is a waveguide having a numerical aperture higher than 0.3 and able to guide the pumping wave, this waveguide being formed by a ring of air holes.

According to a preferred embodiment, the fibre has an integrated spectral filter with a "W" profile.

As another variant, the fibre is contained in a bar of pure silica in order to form a rigid element.

In a preferred implementation, the device according to the invention is operated in an MOPA (master oscillator power amplifier) configuration built around an amplified oscillator architecture comprising:
a doped fibre forming the amplifier;
a source laser emitting in the amplification spectral band of said doped fibre;
means for coupling said source laser to the doped core of said doped fibre, at at least one end of the fibre;
a pumping source emitting in the absorption spectral band of the amplifying fibre; and
means for coupling said pumping source to the cladding of said doped fibre,
said amplifier comprising intracavity wavelength selecting elements able to interact with the injecting means in order to filter a given wavelength and also to reinject into the fibre the pumping wave not absorbed after one pass through the fibre.

As an advantageous variant, said source laser is a semiconductor laser.

Preferably, the coupling means are a coupler comprising N multimode input fibres which can be welded directly to the fibre outputs of N pumping diodes, and an output fibre which can be welded directly to the amplifying fibre.

As a variant, said doped fibre is an amplifying fibre, said source furthermore comprising:
a pumping source emitting in the absorption spectral band of the amplifying fibre;
means for coupling said pumping source to the cladding of said doped fibre; and
an optical resonator, able to reinject the laser beam emitted from the doped core of said fibre, at both ends of said amplifying fibre.

The resonator may be defined by selecting mirrors, volume Bragg gratings or Bragg gratings photowritten in the core of the doped fibre or another geometrically compatible fibre.

In another advantageous embodiment, said doped fibre consists of a doped core surrounded by a tubular section having a refractive index lower than the index of the doped core and of the cladding, the index varying radially and being highest at the centre, lowest in said tubular section, and intermediate in the cladding.

Advantageously, said doped fibre is a polarization-maintaining fibre.

In one advantageous embodiment, the doped fibre exhibits a birefringence higher than $5\times10^{-5}$.

As a variant, the cladding of the doped fibre comprises longitudinal zones doped with a first type of dopant and longitudinal zones doped with a second type of dopant.

As another variant, said doped fibre comprises a core containing at least one photowritten Bragg grating, with a transmission spectrum defined to filter out emissions outside the desired spectral emission band.

As an alternative, the doped fibre is divided into at least two sections, which sections are separated by at least one filter the transmission spectrum of which is defined to filter out emissions outside the desired spectral emission band.

As another alternative, the doped fibre is divided into at least two sections, which sections are separated by at least one optical isolator limiting parasitic laser oscillations outside the desired emission band.

In a first implementation, the optical source emits in continuous wave mode.

As a second variant, it emits in pulsed mode with pulses of pulse lengths between 100 femtoseconds and one microsecond.

The invention also relates to a process for manufacturing a doped fibre intended for a source, characterized in that a central element doped with a rare-earth element, forming the fibre core, and at least six peripheral elements, some of which are doped with a first dopant and some of which are doped with a second dopant, are arranged into a preform, the peripheral elements surrounding said core and forming the fibre cladding.

Advantageously, some of said doped peripheral elements are made of boron and some of them are made of silica.

FIG. 1 shows a cross-sectional view of a fibre according to one embodiment of the invention. This fibre is an "air-clad" fibre with an outside diameter of 200 μm, a cladding diameter of 80 μm, and a core diameter of 20 μm. The core of the fibre consists of a cylindrical zone with a refractive index higher than that of the cladding. This core is doped throughout its volume with the rare-earth element Yb, and with one or more co-dopants chosen from P, Ce, Al and Ge. The multimode guide is defined by the air-clad.

In the ideal case, this fibre would have a core diameter of about 25 μm and a cladding diameter of about 100 μm (area ratio between the cladding and the core of 16). A core diameter between 10 and 30 μm is acceptable for this application. Preferably, the area ratio between the cladding and the core of the fibre will be between 8 and 25 for effective laser operation at 976 nm. It turns out that it is difficult to observe laser radiation at 976 nm above a ratio of 50.

The core, which has a numerical aperture of 0.06, is weakly multimode at 976 nm. The area of the pumping cladding is about 10 times larger than that described in the document by Ylla Jarkko et al, "A 3.5 W 977 nm jacketed air clad fibre laser ytterbium doped fibre laser", OSA Trends in Optics and Photonics, Advanced Solid State Lasers, Vol. 34, 2000.

This area allows several tens of watts of pumping power to be injected. Laser performance obtained at 976 nm is an output power of 10 W at 976 nm and a very low ASE level at 1030 nm. This power, which is limited only by the available pumping power, is three times higher than the preceding record for a flexible fibre. The efficiency of the system (30%) is limited by the degree of coupling of the pump to the air-clad (the numerical aperture of the air-clad was 0.4, but a numerical aperture higher than 0.6 is envisageable).

On account of the brightness level of state-of-the-art diodes, it is envisageable to inject more than 100 W into such a fibre, thereby providing an output power higher than 50 W at 976 nm with a reasonable efficiency of 50%.

In the first instance, such a fibre allows the spatial quality of the output to be improved.

The spatial quality of an optical mode is defined by its $M^2$ parameter, $M^2=1$ corresponding to a perfectly Gaussian diffraction limited mode. The $M^2$ parameter of the output measured for a laser according to the invention is 1.17 for a fibre wound round a mandrel that is 210 mm in diameter. Despite the multimode nature of the fibre, the laser naturally oscillates in its fundamental mode, aided by the slight curvature that creates additional differential losses in higher order modes.

Such a fibre also allows spectral quality to be improved. Spectral selection is not possible with a laser cavity defined by simple mirrors. The laser emission then takes the form of a multitude of lines about the gain maximum at 976 nm (free-running laser).

It is clear that this optical spectrum is incompatible with the acceptance spectral width of the PPLN crystals required for frequency doubling in CW laser sources. To better match the spectrum to that required for doubling, it is possible to use filtering elements having a narrow spectral width, such as a volume Bragg grating (VBG), as an output coupler.

Thus, it is possible to define a spectral line that is about 100 μm in width and therefore compatible with doubling in PPLN crystals of several tens of mm. Nevertheless, the high gain that exists in the spectral band between 975 nm and 980 nm may lead to parasitic multiline oscillation caused by residual intracavity cavity reflections, or by secondary reflection peaks in the VBG.

There is a sure way to prevent parasitic oscillation in the system. Operating the system in MOPA (master oscillator power amplifier) configuration allows a system to be defined that minimizes any reflection. In this case, a relatively low-power laser (master oscillator) is amplified downstream in a fibre amplification stage (power amplifier). The high gain of the fibre ensures an optical efficiency similar to that found in a laser configuration. The major advantage of this system is that it makes it possible to decouple power and spectral quality requirements. A laser may be chosen with properties compatible with the final application, which laser will quite simply be amplified by the fibre, its other properties remaining the same. The spectrum output from an MOPA system. The extinction ratio of the spectrum is higher than 15 dB, which is a clear improvement in extinction ratio relative to the laser case, measured at 7 dB.

Using a spatially single-mode "master" laser makes it possible to increase the degree to which the fundamental mode of the amplifying fibre is excited, allowing the equivalent laser to achieve a higher spatial quality.

The "master" laser may be a fibre laser or a laser diode. At the present time, laser diodes are available that have power, spectral and polarization properties that are perfectly matched to this function:

spatially single-mode and coupled to a fibre;
polarized;
ex-fibre power as high as 400 mW; and
spectral bandwidth lower than 0.1 nm.

Direct amplification of such a laser in a double-clad fibre can yield powers higher than several hundred watts.

The master laser may also be a low-power (for example <5 W) fibre laser. A number of amplification stages may be used to reach very high average powers.

Finally, the master laser may be a pulsed laser (femtosecond, picosecond or nanosecond pulses). In this case, it is very often easier to define the temporal properties of the low-power laser before amplifying the pulses in a power amplifier. It has been observed that, in the case of a Q-switched laser lasing at 976 nm, it is preferable to construct a low-power laser cavity in order to control:

pulse length;
the impact of amplified spontaneous emission (ASE) generated between each pulse emission; and
the spectral purity of the pulses.

These well-controlled pulses will then be amplified in an amplifying fibre, making it possible to reach very high average powers (5-100 W), while preserving their initial spectral, spatial and temporal qualities.

The laser device achieves an advantageous performance in terms of pulse duration, energy, average power and peak power.

The pulses emitted by a Q-switched master oscillator are characterized by a pulse length of 12 ns and a repetition rate adjustable in a range between 10 and 400 kHz. The spectral width of the master source is fixed by an intracavity filter component (VBG) to 125 μm. The performance achieved with an example embodiment is as follows:

maximum average power: 78 W;
maximum energy: ~1 mJ; and
maximum peak power>100 kW.

After frequency doubling at 488 nm in a nonlinear LBO crystal, 16.1 W of emitted laser power was obtained in the blue for an IR power of 44 W. It will be recalled that the previous record, dating from 2006, was the emission of 83 mW in the blue (A. Bouchier, G. Lucas-Leclin, P. Georges, and J. Maillard, "Frequency doubling of an efficient continuous wave single-mode Yb-doped fibre laser at 978 nm in a periodically-poled MgO:LiNbO3 waveguide", Opt. Express 13, 6974-6979 (2005)).

This performance therefore constitutes a record in terms of single-mode radiation beams in the spectral bandwidths in question (IR and visible), both in terms of average power and in terms of energy per pulse.

Polarization-Maintaining Fibres

The effectiveness with which frequency doubling obtains an emission in the blue (488 nm) is maximized if the radiation beam at 976 nm is entirely polarized. To do this, it is necessary for the amplifying fibre to maintain the polarization of the radiation beam.

Considering the geometric constraints (low core/clad area ratio), it is reasonable to ask how this function may be produced—it would be impossible to use a conventional polarization-maintaining structure (PANDA or bow-tie fibre) due to the limited space around the core.

A number of specific geometries are envisageable:
an elliptical-core fibre: a noncircular core has the property of being intrinsically birefringent, with the advantage of not imposing constraints on the dimensions of the cladding. An elliptical core (or a core with any other elongate shape) is defined by a ratio of the length of the major axis to the length of the minor axis of at least 1.1:1; and fibres manufactured by assembling a number of elements in a preform before fibre drawing.

In this particular geometry, using more than one rod of boron-doped silica allows the volume of boron-doped silica (boron being the element that induces the strain responsible for the birefringence) to be increased without excessively increasing the clad diameter.

An ytterbium-doped central element is introduced into the preform and surrounded by boron-doped and neodymium-doped elements. In the example described, the elements are arranged radially, in adjacent pairs of elements with the same type of doping.

It is also possible, in certain configurations, for this fibre to act as a polarizing fibre—in this case, instead of creating a large difference between the effective refractive indices of the two polarizations (polarization-maintaining fibre), winding the fibre with a specific radius of curvature aligned with the axis of the boron-doped elements may increase propagation losses for one of the two polarization axes. This is particularly advantageous in laser modes where it is necessary to discriminate between two polarization states in order to emit a polarized beam.

Such a fibre has been measured with a birefringence greater than $10^{-4}$.

Writing of Tilted Bragg Gratings

Tilted Bragg gratings can introduce propagation losses to one of the two polarization axes. These gratings can be used to convert a normal fibre into a polarization-maintaining fibre and to convert a polarization-maintaining fibre into a polarizing fibre. It is a question of writing a number of gratings along the entire length of the Yb-doped fibre. This device may also act as a filter.

Filtering ASE Around 1030 nm

The laser cavities described are limited because they require stringent filtering of ASE around 1030 nm, this filtering taking place outside of the doped fibre (filter element inserted in the cavity at the fibre output). Since external filtering of more than 60 dB is difficult to achieve, this constraint severely limits the length of the fibre (and the efficiency of the laser) useable in practice. An elegant way to circumvent this constraint is to introduce means for filtering this parasitic radiation along the entire amplifying fibre. This is possible with a number of devices.

Amplifying Fibre with "W" Index Profile

The use of a "buried" cladding around the doped core makes it possible to create a wide variation in the effective refractive index seen by the fundamental mode as a function of wavelength.

In this case a ring having a low refractive index (lower than that of the cladding) is placed around the doped core—this ring most often consists of silica co-doped with fluorine.

For a certain radius of curvature of the fibre, it is possible to introduce additional losses for the mode about 1030 nm without impacting the laser mode at 976 nm. This makes it possible to relax the constraints on the length of the fibre because the gain at 1030 nm is offset by guiding losses.

This fibre-drawing geometry is obviously more complicated to implement and may impose certain additional constraints on the geometry of the fibre.

Other filtering methods are also possible in the case where these constraints are incompatible with the desired laser characteristics:

Writing of Bragg Gratings at a Number of Locations Along the Amplifying Fibre There are two types of Bragg grating that are capable of playing a role in ASE filtering, LPG (long period gratings) and TFBG (tilted fibre Bragg gratings):

LPGs operate by selectively coupling certain wavelengths to cladding modes. The light is ejected from the single-mode core into the cladding where the light co-propagates but receives only little optical gain because of its slight overlap with the doped core. It is possible to introduce losses greater than 10 dB over a spectral width of several tens of nanometers.

TFBGs work in a similar way but the light that is ejected into the clad is generally reflected back. These gratings are also sensitive to polarization and, as mentioned above, may be used to make the fibre polarizing at the signal wavelength. For parasitic wavelengths, two gratings may be written to introduce losses for each polarization.

For both types of grating, gratings can be written in a number of locations along the entire fibre in order to increase the parasitic radiation rejection ratio.

Operation with Two or More Amplification Stages

The filtering methods mentioned above require the doped fibre to have a specific architecture or the fibre to be modified by introducing photowritten filters. A last envisageable filtering method requires no modification of the doped fibre.

What is valid for the MOPA case is also valid for the laser case. It is a question of separating the amplifying fibre into two or more parts and recycling the pumping of each section. The signal obtained from each section is injected into the following section (4 mirrors define the path taken by light at 920 nm, the first mirror at least being a dichroic mirror that separates the signal at 976 nm from the pumping at 920 nm). The pumping is reinjected into the next section in order to avoid decreasing the overall efficiency. It is also possible to imagine using independent stages in which the pumping of each stage is recycled in the same stage. Between each stage, the wave at 976 nm and the ASE at 1030 nm pass into an optical filter that allows the wave at 976 nm to pass, but that attenuates the ASE at 1030 nm. An optical isolator is also used (only in the MOPA case) to attenuate the ASE at 976 nm, which ASE, since it is counter-propagating, may capture a significant portion of the laser power.

Relative to a single step configuration, this configuration allows a greater total length of fibre to be used. It is also compatible with a fully integrated system where a multimode coupler is used in the reverse direction to separate the pump and the signal after the first step, and a second coupler is used to combine the pump and the signal in the second amplification step.

Other Operating Modes

The concept whereby special fibres are used for amplification at 976 nm may also be applied to an ASE source configuration in which the system consists of an amplifying fibre pumped from one side, a spectral filtering system and a 100% mirror at 976 nm, and also a pump reinjection system. This source produces an unpolarized, spatially single-mode CW radiation beam at 976 nm with a bandwidth of a few nm.

The MOPA architecture can also be modified to generate ultrashort pulses at 976 nm. Specifically, the master oscillator may be mode-locked to produce pulses in the 100 fs$^{-1}$ ps range. These pulses are then amplified either directly in the power amplifier fibre or using the chirped pulse amplification technique in which they are temporally stretched before amplification, their spectral components subsequently being compressed in a dispersive element of opposite sign to the stretcher (compressor).

The invention also comprises fully integrated embodiments. The integrated coupling of these embodiments can apply both to laser configurations and to MOPA configurations. Thus, the optical source according to the invention comprises:
- N multimode 100/125 μm laser diodes (NA=0.15);
- an all-fibre N to 1 pumping coupler;
- a network of Bragg gratings photowritten into the doped core of the amplifying fibre, having maximum reflectivity (100%) at 977 nm;
- an air-clad double-clad microstructured 20/80 fibre doped with ytterbium ions;
- a Bragg grating photowritten into the doped core of the amplifying fibre having a reflectivity of 10% at 977 nm; and
- an angle-polished high-power SMA connector.

Thus, in this embodiment, the coupling means are a coupler comprising N multimode input fibres which can be welded directly to the fibre outputs of N pumping diodes, and an output fibre which can be welded directly to the amplifying fibre.

Likewise, in a fully integrated high-power 977 nm MOPA configuration, one embodiment of the invention comprises:
- an angle-polished high-power SMA connector;
- N multimode laser diodes (100/125 μm NA=0.15);
- an all-fibre pump combiner having N multimode inputs and a single-mode signal output at 977 nm;
- an air-clad double-clad microstructured 20/80 fibre doped with ytterbium ions;
- a cladding mode suppressor and a mode adapter; this adapter is preferably a 20 to 6 mode adapter;
- a fibre isolator operating at 977 nm;
- a narrow spectral width single-mode laser diode lasing at 977 nm.

In another example, with reference to patent application FR 08/55879, a fibre according to the invention is implemented in a device comprising:
- a laser diode;
- an amplifying optical fibre;
- coupling means; and
- a resonator including wavelength-selecting elements.

The laser diode used is a multimode-transverse pumping source lasing at about 915 nm, the power of which is 230 W and the emitted radiation beam of which is delivered by an optical fibre having a diameter of 400 μm and a numerical aperture NA=0.22.

The lens has a numerical aperture of 0.5 and a focal length of 8 mm and the dichroic mirror is totally reflecting at the pumping wavelength, i.e. at about 915 nm.

The means for coupling the pumping wave to the cladding of the doped fibre comprise two lenses having focal lengths of 18 mm and 8 mm, respectively, and a dichroic mirror transparent at the pumping wavelength and reflecting at the laser wavelength.

The selecting optics are two dichroic mirrors.

The optical fibre is what is called a rod-type photonic crystal fibre. This fibre has a short length of no more than 1.23 m.

Photonic fibres, unlike conventional fibres, are not made entirely of a solid transparent material such as doped silica; the cross section of a photonic fibre contains a network of air holes.

These holes lie parallel to the axis of the fibre, and extend longitudinally along the fibre. In practice, these holes may be obtained by arranging capillary tubes or cylinders of silica in the preform in a pattern respecting the pattern of the holes to be obtained in the fibre. Drawing such a preform produces a fibre with holes corresponding to the capillary tubes.

The presence of these holes in the material of the fibre creates variations in the average refractive index of the material. These index variations may, as in a conventional optical fibre, be used to guide, via total internal reflection, light signals at set wavelengths.

This fibre is a constituent element of the device that makes it possible to implement a high-power three-energy-level fibre laser.

It will be noted that this type of fibre laser is more compact, more stable, and has less constraining cooling needs compared to semiconductor technologies.

It also provides a better beam quality, the beam quality being set by the guiding properties of the fibre, and therefore has a better resolution for engraving applications.

This optical fibre is doped with a rare-earth ion that is mainly ytterbium in this embodiment. It is therefore an ultra-large-core rod-type optical fibre doped with ytterbium (Yb).

Ytterbium is one of the rare-earth ions or metal ions that are commonly used to produce laser sources. Among all the useable ions, only ytterbium ions, which are rare-earth ions, have a transition near 976 nm.

It will be noted that the ratio of the core/cladding areas is substantially 6.5 in the fibre used.

In another embodiment, this ratio lies between 5 and 100.

Regarding the absorption and emission spectra of $Yb^{3+}$ ions in silica, materials doped with $Yb^{3+}$ ions have a very large effective emission cross section near 976 nm, associated with an absorption band near 915 nm.

The effective absorption cross section of ytterbium in glasses is substantially larger than the effective emission cross section.

The relative size of the effective cross sections of emission near 976 nm and of absorption near 915 nm depends on the crystalline or amorphous matrix used. Diode pumping may be envisaged for an absorption band with a full width at half-maximum of about ten nanometers at 915 nm. Nevertheless, this strong emission about 976 nm is accompanied by an equally intense absorption.

Pumping occurs between the lowest sublevel of the $^2F7/2$ multiplet and the highest sublevel of the $^3F5/2$ multiplet. Emission takes place between the lowest sublevel of the $^3F5/2$ multiplet and the lowest sublevel of the $^2F7/2$ multiplet.

This is therefore a true three-level transition, hence obtaining emission about 976 nm places major constraints on the pumping of these materials.

In the absence of pumping, materials doped with ytterbium ions absorb all radiation at wavelengths of about 976 nm. To obtain emission near 976 nm, the pumping of the material must be sufficiently intense to establish transparency population inversion at the 976 nm laser wavelength in the doped medium. In other words, the pumping intensity about 915 nm must be sufficient to make the doped medium transparent near 976 nm. This intensity, corresponding to zero absorption at the 976 nm laser wavelength in the material, is called the transparency intensity.

Using this fibre made of silica doped with $Yb^{3+}$ allows the pumping to be confined to the doped medium, and makes it easy to achieve the transparency intensity over the length of this doped medium. This fibre therefore guarantees substantial interaction between the pumping beam and the dopant ion over a large length because the light is confined to the pumping cladding of the fibre.

The ytterbium-doped fibre used to generate this transition is a single-transverse-mode fibre the dimensions of which (diameter of 80 µm) are a record for a single-mode fibre. Such extreme dimensions are made possible for the doped core by the network of very small (diameter smaller than 100 nm) air holes, which decrease the average refractive index of the cladding surrounding the doped core and make it possible to obtain a core numerical aperture of about 0.01.

The signal at substantially 977 nm propagates in the doped core of 80 µm diameter, and the pumping at substantially 915 nm propagates inside the optical cladding of 200 µm diameter, the cladding having a large numerical aperture higher than 0.7. This cladding is defined by an air-filled microstructure.

This microstructure comprises holes that are much larger (>2 µm) than those in the core, arranged in a pattern that preserves the symmetry of the fibre about its longitudinal axis.

It will be noted that the dimensions of the holes in the core and cladding of the fibre, respectively, may be adjusted depending on the desired guiding properties: core diameter, numerical aperture of the cladding or of the core.

In the configuration in which pumping takes place via the optical cladding, this fibre exhibits a pumping absorption of 10 dB/m at 915 nm.

By virtue of a very effective pumping/doped core overlap, this fibre allows 230 W of pumping power to be absorbed over very short lengths (123 cm). Over such a length, the pumping intensity remains, uniformly along the fibre, below the transparency intensity, and the parasitic gain in the spectral band between 1010 nm and 1100 nm is sufficiently low that it can be compensated for by the set of wavelength-selecting elements.

In this device, the laser diode emits a radiation beam at a wavelength lying between 910 and 940 nm.

In a particular configuration, the pumping laser diode used delivers powers of 10 W to 1000 W, the pumping beam possibly being delivered directly to free space, or coupled to a multimode fibre having a diameter of between 50 and 800 µm.

The light emitted by the pumping diode is coupled to a transporting fibre then injected into the amplifying fibre by virtue of optical means. These coupling means comprise two lenses in this particular configuration.

The optical means are designed to couple light originating from the transporting fibre to the laser fibre. In particular, these optical means produce a magnification that allows the image of the core of the transporting fibre of the pump seen at the laser diode output to be made substantially equal to or smaller than the diameter of the pumping cladding of the fibre laser.

Likewise, these optical means have a numerical aperture higher than or equal to the product $NA_1/M$ where M is the magnification of the optical system and $NA_1$ is the numerical aperture of the transporting fibre.

For example, if the case is considered where the multimode diode emitting at 915 nm is coupled to a fibre having a diameter of 400 µm and a numerical aperture of 0.22, and the fibre laser has a pumping cladding with a diameter of 200 µm and a numerical aperture of 0.7, the optical means must produce a magnification M≤200/400=0.5 and have an image numerical aperture of at least 0.5. In the example given here, the optical means are composed of a pair of two aspherical lenses: a first lens of 18 mm focal length and a second lens of 8 mm focal length.

The 8 mm lens has a numerical aperture of 0.5.

In one particular configuration, these two lenses may be microlenses, cylindrical lenses, elliptical lenses, hyperbolic lenses, or aspheric condenser lenses.

In other configurations, the coupling means may be:
- a coupler comprising N multimode input fibres which can be welded directly to the fibre outputs of N pumping diodes, and an output fibre which can be welded directly to the large-core amplifying fibre; or
- a large-mode-area optical fibre the cross section of which gradually narrows in order to produce a funnel-shaped structure. One end of this fibre has the same diameter as the fibre delivering the pumping wave, and the other end has the same diameter as the cladding of the amplifying fibre.

In the case where the coupling means are a fibre section, the two ends of this "funnel-shaped" fibre are then welded to the output of the transporting fibre of the diode and to the input of the large-doped-core amplifying fibre, respectively.

The fibre has a geometry that enables single-mode propagation in the core and multimode propagation in the pumping cladding. The ratio between the diameters of the core and of the pumping cladding is less than 10. In this particular configuration, the single-transverse-mode fibre has large dimensions, the diameter of the doped core being 80 µm. Such doped-core dimensions are made possible by the network of very small (<100 nm in diameter) air holes that decrease the average index of the cladding and make it possible to obtain a core with a numerical aperture of about 0.01.

The signal at substantially 977 nm propagates in the doped core of 80 µm diameter, and the pumping at substantially 915 nm propagates inside the optical cladding of 200 µm diameter, the cladding having a large numerical aperture higher than 0.7.

This cladding is defined by an air-filled microstructure. This microstructure comprises holes that are much larger (>2 µm) than those in the core, arranged in a pattern that preserves the symmetry of the fibre about its longitudinal axis.

For lower powers, it is possible to use smaller cores. The ratio between the cross-sectional areas of the doped core of the fibre and the pumping cladding must remain between 5 and 100, and is preferably closer to 5.

The cladding of the fibre may have a cladding diameter, for guiding the pumping, of between 50 and 400 µm.

The amplifying fibre supports single-mode propagation of the beam in the doped core at a wavelength of substantially 977 nm.

The fibre is intrinsically polarization-maintaining or simply held in a fixed position. The core of the fibre may contain, in addition to the rare-earth dopant ions, one or more of the following chemical species: germanium, phosphorus, boron and fluorine.

The doped core of the fibre has a diameter larger than 12 µm. This is therefore an LMA (large-mode-area) fibre.

The large-mode-area fibre may be a microstructured air/silica fibre that is rigid or flexible. The length of the fibre is chosen so that the pumping intensity at the output of the fibre is higher than the transparency intensity at the output of the fibre, and so that undesirable gain in the band between 1010 nm and 1100 nm is kept below 60 dB.

In this embodiment, for 230 W of injected pumping power, 63 W of residual pumping power is measured after a propagation length of 123 cm, for a calculated transparency power of 11 W. This power corresponds to transparency intensities of 30 kW/cm² and to a pumping cladding cross-sectional area of 31500 µm.

In this embodiment, the gain at 1030 nm is substantially 50 dB.

The residual pumping wave at the output of the pumping cladding and the laser wave output from the core of the amplifying fibre are then collimated by an optical means.

The laser wave is reflected by the mirror that is totally reflecting at the laser wavelength of substantially 977 nm, whereas the pumping wave at substantially 915 nm is not reflected. This residual pumping then strikes a mirror that is highly reflecting at the pumping wavelength, i.e. 915 nm in this embodiment.

The position of this mirror is calculated so that the pumping beam reflected by the mirror is exactly reinjected into the pumping cladding of the laser fibre. For a flat mirror, this position corresponds to that of the image of the output face of the laser fibre seen through the optical means.

The pumping wave then makes a second trip through the laser fibre, thereby increasing the absorption of the pumping and increasing population inversion and the efficiency of the laser.

In another configuration, this means for recycling the pumping power may be a Bragg grating photowritten into the core of the fibre, or a volume Bragg grating in free space, or a prism, or a grating.

A dichroic mirror is placed between the two optical means. This dichroic mirror is totally reflecting at about 977 nm, and totally transparent at the pumping wavelength.

A second mirror that is totally reflecting at about 977 nm is placed on the trajectory of the laser beam in order to form a resonator with that face of the fibre which is opposite the pump.

In another configuration, the resonator is formed using mirrors with a high reflectivity (HR mirrors) or a finite reflectivity at a wavelength of substantially 977 nm.

The reinjecting devices located at the ends of the fibre may be Bragg gratings photowritten directly into the doped core of the fibre, reflecting at a wavelength of substantially 977 nm, or sections of undoped fibre containing a Bragg grating, reflecting at a wavelength of substantially 977 nm, written into the core, these fibre sections being welded to the amplifying fibre. The reinjecting devices located at the ends of the fibre may be volume Bragg gratings.

One or more of the constituent elements of the resonator may be wavelength-selecting elements i.e. elements that reflect wavelengths of substantially 977 nm and that are very weakly reflective in the band between 1010 nm and 1100 nm.

The set of optical elements comprises a mirror that is totally transparent at the 977 nm laser wavelength and that has a reflectivity>99% in the band between 1010 nm and 1100 nm, and a cavity end mirror that has a transmission>99% in the band between 1010 nm and 1100 nm.

In total, this set of optical elements induces enough losses in the band between 1010 nm and 1100 nm that the laser spontaneously oscillates about 977 nm.

In another configuration, the wavelength-selecting means are:
  one or more dichroic mirrors able to reflect a signal of a given wavelength;
  one or more absorbing or interferometric filters;
  a particular curvature in the amplifying fibre;
  a dopant element added to the make-up of the core of the fibre, absorbing in the band between 1010 nm and 1100 nm;
  a Bragg grating photowritten into the core of the fibre or a volume Bragg grating outside of the fibre; or
  a prism or a grating.

This device therefore allows laser power to be generated in the region of 976 nm, and easily allows powers of about several hundreds of watts, compared to 10 W in the prior art, to be obtained with an excellent beam quality.

The laser light delivered is a very powerful single-transverse-mode beam in the region of 976 nm.

The device, via the combination of:
  an ultra-large-core rod-type Yb-doped fibre;
  spectrally selecting optics allowing parasitic laser effects at undesired wavelengths to be removed; and
  optics allowing unabsorbed pumping power to be recycled,
allows power levels of more than 100 W, even 1 kW, to be produced at 977 nm. Depending on the power of the pumping diode at substantially 915 nm, the power of the high-power three-energy-level laser at substantially 977 nm is a function of the pumping power at substantially 915 nm.

The laser threshold is obtained with a pumping power value for the diode of 18 W at 915 nm. With the maximum obtainable pumping power i.e. 230 W, the laser power produced was as high as 94 W at 977 nm.

The efficiency slope of the laser, between the pumping power and the laser power, is 48%.

The quality of the laser beam remains excellent at such power values, and the performance of the device is limited by the pumping power obtainable from the diode.

The output spectrum of the laser is measured at full output power using an optical spectrum analyser with a resolution of 0.07 nm.

The laser oscillates spontaneously in a 6 nm-wide spectral range centred on 977 nm.

Because of the effective spectral filtering action of the combination of the second and third mirrors, the parasitic emission at 1030 nm is 35 dB below the maximum laser signal at 977 nm.

More than 98% of the spectral power density is contained in the spectral range between 975 nm and 980 nm.

For the sake of comparison, the output spectrum of the laser and the spectrum of the amplified spontaneous emission are obtained by suppressing mirror feedback.

Furthermore, the doped fibre has a core diameter that is very much larger than the core diameters of standard single-mode fibres (i.e. having core diameters<12 µm). The diameter of the core is chosen to lie between 12 µm and 200 µm. To obtain very high powers, the invention employs special microstructured (or index-stepped) large-mode-area (LMA) optical fibres that may have record core diameters, currently ranging as high as 80 µm, and that are able to optically guide single-mode laser beams at wavelengths about 977 nm.

The device according to the invention also makes it possible to obtain a high-power laser at 488 nm since it has an excellent spatial quality allowing the beam to be focused on the smallest possible volume, and sufficient power to obtain high efficiencies in the nonlinear stage.

This device is a solid-state laser medium that emits directly at wavelengths of substantially 488 nm, and that has the advantage of being less bulky, more reliable, and less expensive than devices employing a solid medium emitting between 800 and 1100 nm to which a nonlinear optical stage is added in order to carry out frequency mixing or frequency doubling. These devices implement a method consisting in producing a radiation beam at 976 nm or 1029 nm and then doubling its frequency. Such a nonlinear frequency doubling stage places major constraints on the properties of the fundamental beam at 976 or 1029 nm.

Indeed, as a variant, the photonic optical fibre may be doped with rare-earth ions or metal ions other than ytterbium ions.

The present invention is not limited to just the optical pumping devices described above, by way of example it also relates to any variant respecting the same principle.

The invention claimed is:

1. An optical pumping device comprising:
a fiber-based optical source emitting a controlled radiation beam with a very high transverse mode quality at a wavelength shorter than 1000 nm, said fiber-based optical source being adapted to emit a pumping light with an average power higher than 2 W and a mode quality wherein an $M^2$ factor is below 5,
at least one element comprising an amplifying material doped with a rare-earth dopant comprising ytterbium, thulium, erbium, or any one of the combinations of these rare earths, said doped amplifying material being adapted to receive the pumping light;
first means adapted to introduce the pumping light into the amplifying material, the first means comprising coupling means and selecting means, the coupling means comprising lenses having any one of at least following lenses: (a) microlenses, (b) cylindrical lenses, (c) elliptical lenses, (d) hyperbolic lenses, (e) aspheric condenser lenses, the selecting means comprising means having any one of at least following means: (f) dichroic mirror, (g) absorbing filter, (h) interferometric filter, (j) active electro-optic filter, (k) acousto-optic filter, (l) external volume grating, (m) prism, (n) Bragg grating, the coupling means and the selecting means are adapted to co-operate with each other; and
second means adapted to cool the element and comprising any one of at least following cooling apparatus: (o) air-based cooling apparatus, (p) water-based cooling apparatus, (r) Peltier effect-based cooling apparatus, (s) cryogenic-based cooling apparatus,
wherein the amplifying material comprises a crystal with a length comprised in a first range from 100 microns to 50 centimeters.

2. The optical pumping device according to claim 1, wherein the length of the crystal is comprised in a second range from 0.5 mm to 50 mm.

3. The optical pumping device according to claim 1, wherein the length of the crystal is comprised in a third range from 5 mm to 50 mm.

4. The optical pumping device according to claim 1, wherein the length of the crystal is comprised in a fourth range from 1 cm to 15 cm.

5. The optical pumping device according to claim 1, wherein the second means are arranged along the crystal, and wherein the crystal is wrapped by the second means.

6. The optical pumping device according to claim 2, wherein the second means are arranged along the crystal, and wherein the crystal is wrapped by the second means.

7. The optical pumping device according to claim 3, wherein the second means are arranged along the crystal, and wherein the crystal is wrapped by the second means.

8. The optical pumping device according to claim 4, wherein the second means are arranged along the crystal, and wherein the crystal is wrapped by the second means.

9. The optical pumping device according to claim 1, wherein the fiber-based optical source comprises:
at least one laser diode having an excitation wavelength between 750 nm and 976 nm, the laser diode forming a pre-pumping source able to emit a pumping wave;
a pumping cladding;
a section of clad amplifying optical fiber having two ends, said amplifying optical fiber containing a core comprising a cylindrical part doped with a rare earth having ytterbium, erbium, and thulium, in order to obtain a core with a refractive index higher than that of the cladding, said section of clad amplifying optical fiber forming a doped fiber, and
an optical coupler adapted to couple the pumping source to the pumping cladding of the doped fiber.

10. The optical pumping device according to claim 9, wherein the fiber-based optical source has an emission spectrum lying in a band between 970 and 985 nm.

11. The optical pumping device according to claim 10, wherein the core diameter is comprised in a fifth range from 10 μm and 30 μm, wherein an area ratio between the pumping cladding and the core is comprised in a sixth range from 6 to 25, wherein the pumping wave is emitted at 976nm, wherein a numerical aperture of the core is 0.06 and wherein the core is multimode at 976nm.

12. A process of producing of an optical pumping device including:
a fiber-based optical source emitting a controlled radiation beam with a very high transverse mode quality at a wavelength shorter than 1000 nm, said fiber-based optical source being adapted to emit a pumping light with an average power higher than 2 W and a mode quality wherein an $M^2$ factor is below 5,
at least one element comprising an amplifying material doped with a rare-earth dopant comprising ytterbium, thulium, erbium, or any one of the combinations of these rare earths, said doped amplifying material being adapted to receive the pumping light;
first means adapted to introduce the pumping light into the amplifying material, the first means comprising coupling means and selecting means, the coupling means comprising lenses having any one of at least following lenses: (a) microlenses, (b) cylindrical lenses, (c) elliptical lenses, (d) hyperbolic lenses, (e) aspheric condenser lenses, the selecting means having means comprising any one of at least following means: (f) dichroic mirror, (g) absorbing filter, (h) interferometric filter, (j) active electro-optic filter, (k) acousto-optic filter, (l) external volume grating, (m) prism, (n) Bragg grating, the coupling means and the selecting means are adapted to co-operate with each other; and
second means adapted to cool the element and comprising any one of at least following cooling apparatus: (o) air-based cooling apparatus, (p) water-based cooling apparatus, (r) Peltier effect-based cooling apparatus, (s) cryogenic-based cooling apparatus,
wherein the amplifying material comprises a crystal with a length comprised in at least one of following ranges: (a) from 100 microns to 50 centimeters; (b) from 0.5 mm to 50 mm; (c) from 5 mm to 50 mm; (d) from 1 cm to 15 cm,
said process of producing comprising a step of manufacturing of the an optical fiber doped with a rare earth and adapted to said fiber-based optical source, wherein a central segment doped with a rare-earth and adapted to form a core of the optical fiber, as well as at least six peripheral segments some of which being doped with a first dopant and some of which being doped with a second dopant, are arranged into a preform, said peripheral segments surrounding said core and forming a cladding of the optical fiber.

13. The process for manufacturing according to claim 12, wherein some of said doped peripheral segments are made of boron and some of them are made of silica.

14. An amplification architecture comprising an optical pumping device including:
- a fiber-based optical source emitting a controlled radiation beam with a very high transverse mode quality at a wavelength shorter than 1000 nm, said fiber-based optical source being adapted to emit a pumping light with an average power higher than 2 W and a mode quality wherein an $M^2$ factor is below 5,
- at least one element comprising an amplifying material doped with a rare-earth dopant comprising ytterbium, thulium, erbium, or any one of the combinations of these rare earths, said doped amplifying material being adapted to receive the pumping light;
- first means adapted to introduce the pumping light into the amplifying material, the first means comprising coupling means and selecting means, the coupling means comprising lenses including any one of at least following lenses: (a) microlenses, (b) cylindrical lenses, (c) elliptical lenses, (d) hyperbolic lenses, (e) aspheric condenser lenses, the selecting means comprising means having any one of at least following means: (f) dichroic mirror, (g) absorbing filter, (h) interferometric filter, (j) active electro-optic filter, (k) acousto-optic filter, (l) external volume grating, (m) prism, (n) Bragg grating, the coupling means and the selecting means are adapted to co-operate with each other; and
- second means adapted to cool the element and comprising any one of at least following cooling apparatus: (o) air-based cooling apparatus, (p) water-based cooling apparatus, (r) Peltier effect-based cooling apparatus, (s) cryogenic-based cooling apparatus,
  wherein the amplifying material comprises a crystal with a length comprised in at least one of following ranges: (a) from 100 microns to 50 centimeters; (b) from 0.5 mm to 50 mm; (c) from 5 mm to 50 mm; (d) from 1 cm to 15 cm,
  wherein the amplification architecture further includes:
- an oscillator;
- an amplifier comprising any one of at least following amplifiers: (t) single-pass amplifier, (u) multipass amplifier;
- a regenerative amplifier;
- an architecture for pumping a core of a fiber doped with a rare-earth dopant comprising ytterbium, thulium, erbium, or any one of the combinations of these rare earths; and
- an architecture for pumping the crystal in which the pumping light is not guided by the crystal.

* * * * *